April 4, 1944. W. C. EDWARDS 2,345,869
APPARATUS FOR EXHIBITING MOTION PICTURE FILM
Filed June 18, 1941 7 Sheets-Sheet 1

Inventor
William C. Edwards
By Lyon & Lyon
Attorneys

April 4, 1944. W. C. EDWARDS 2,345,869
APPARATUS FOR EXHIBITING MOTION PICTURE FILM
Filed June 18, 1941 7 Sheets-Sheet 2

Inventor
William C. Edwards
By Lyon & Lyon
Attorneys

April 4, 1944.  W. C. EDWARDS  2,345,869
APPARATUS FOR EXHIBITING MOTION PICTURE FILM
Filed June 18, 1941   7 Sheets-Sheet 3
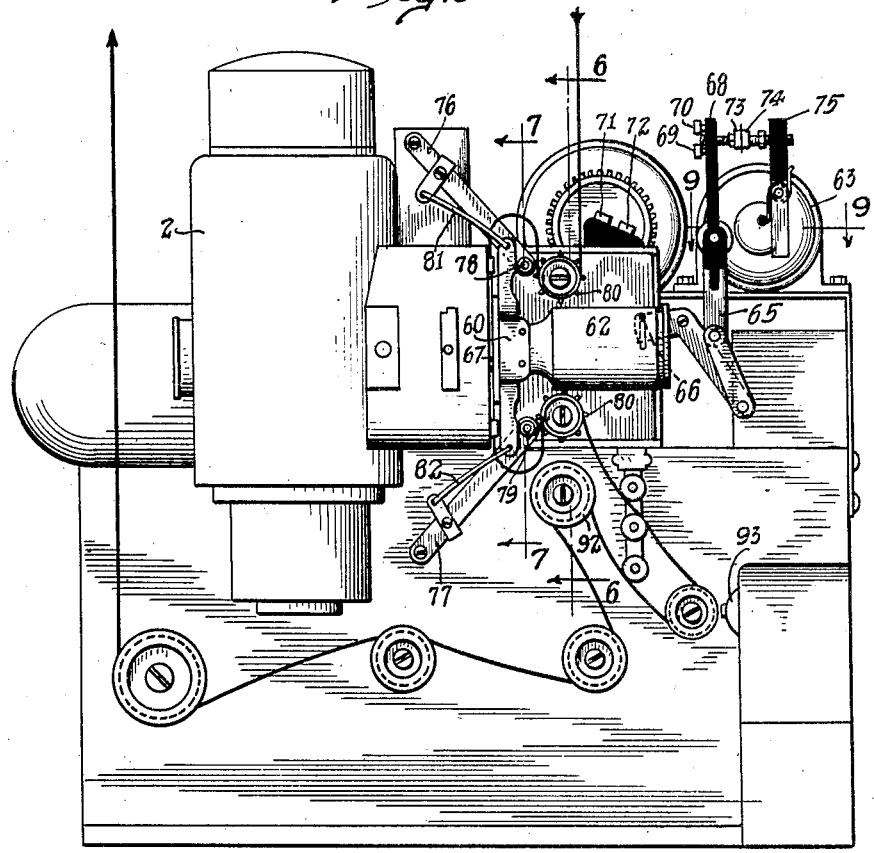
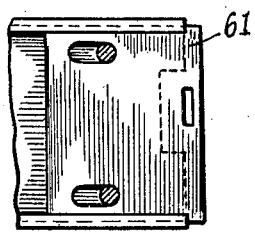
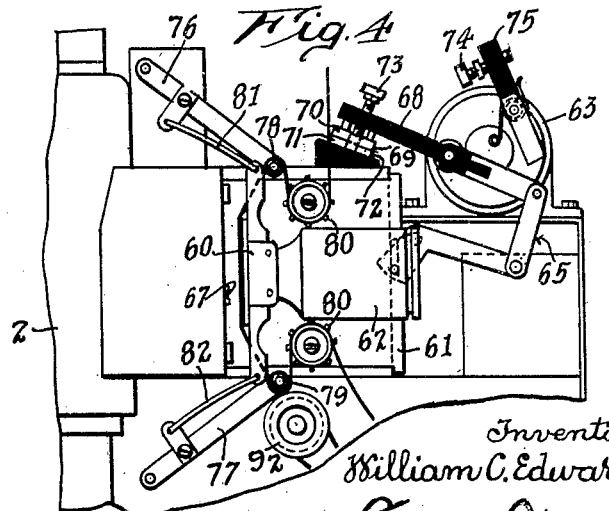
Inventor
William C. Edwards
By Lyon & Lyon Attorneys

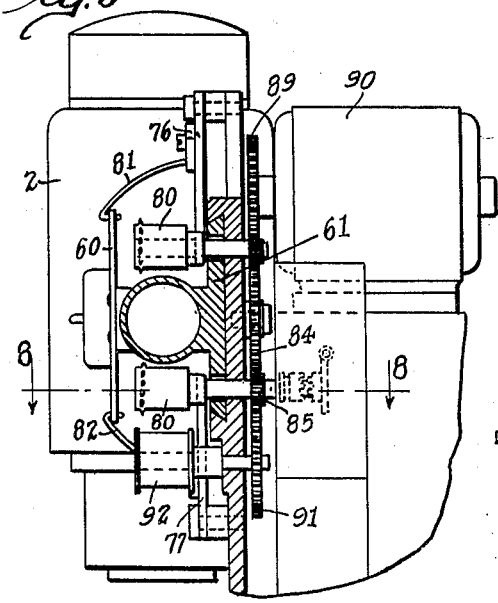
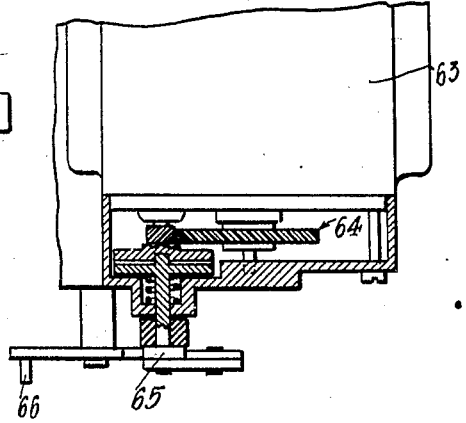
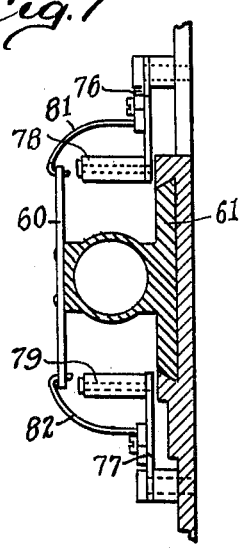
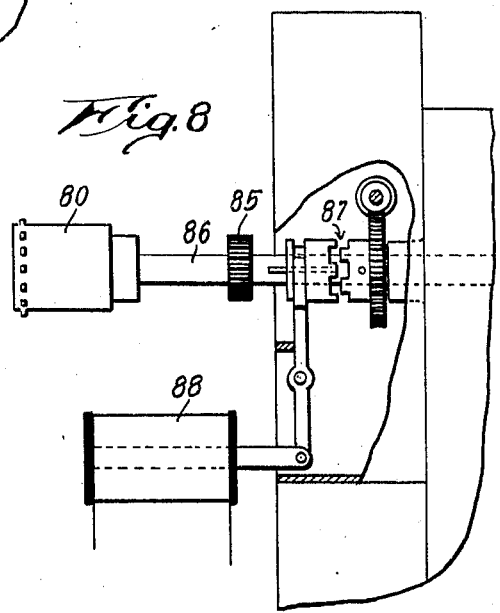

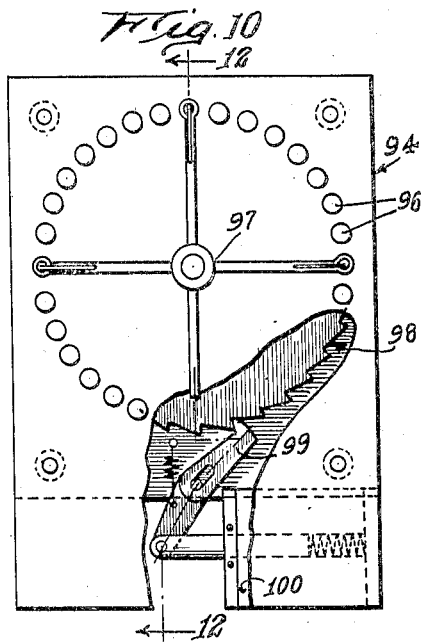
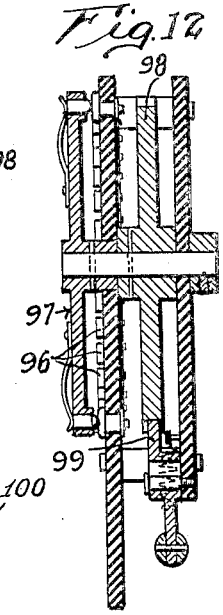
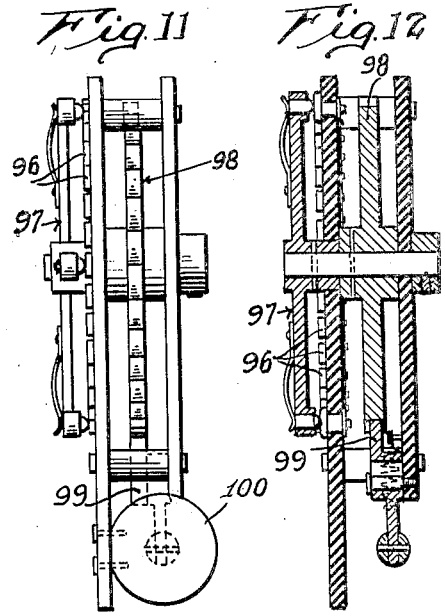
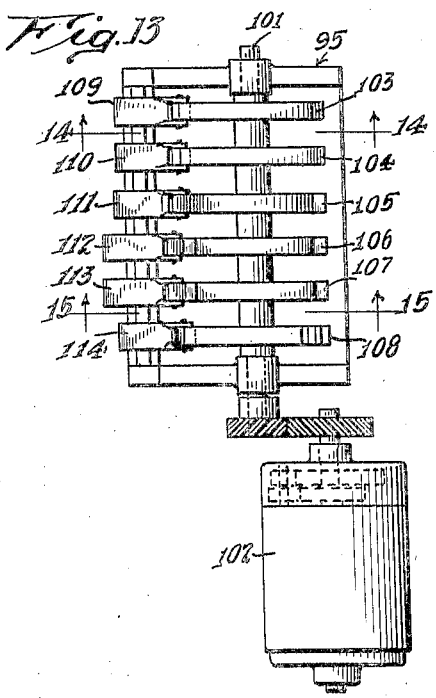
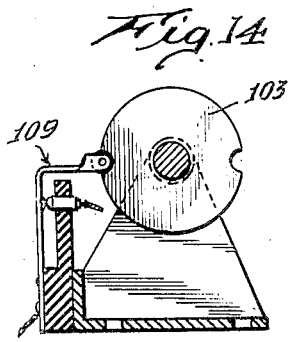
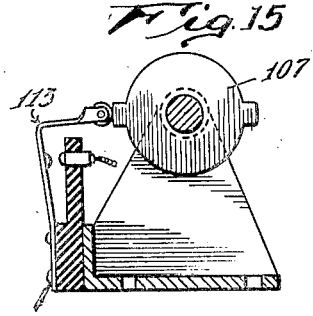

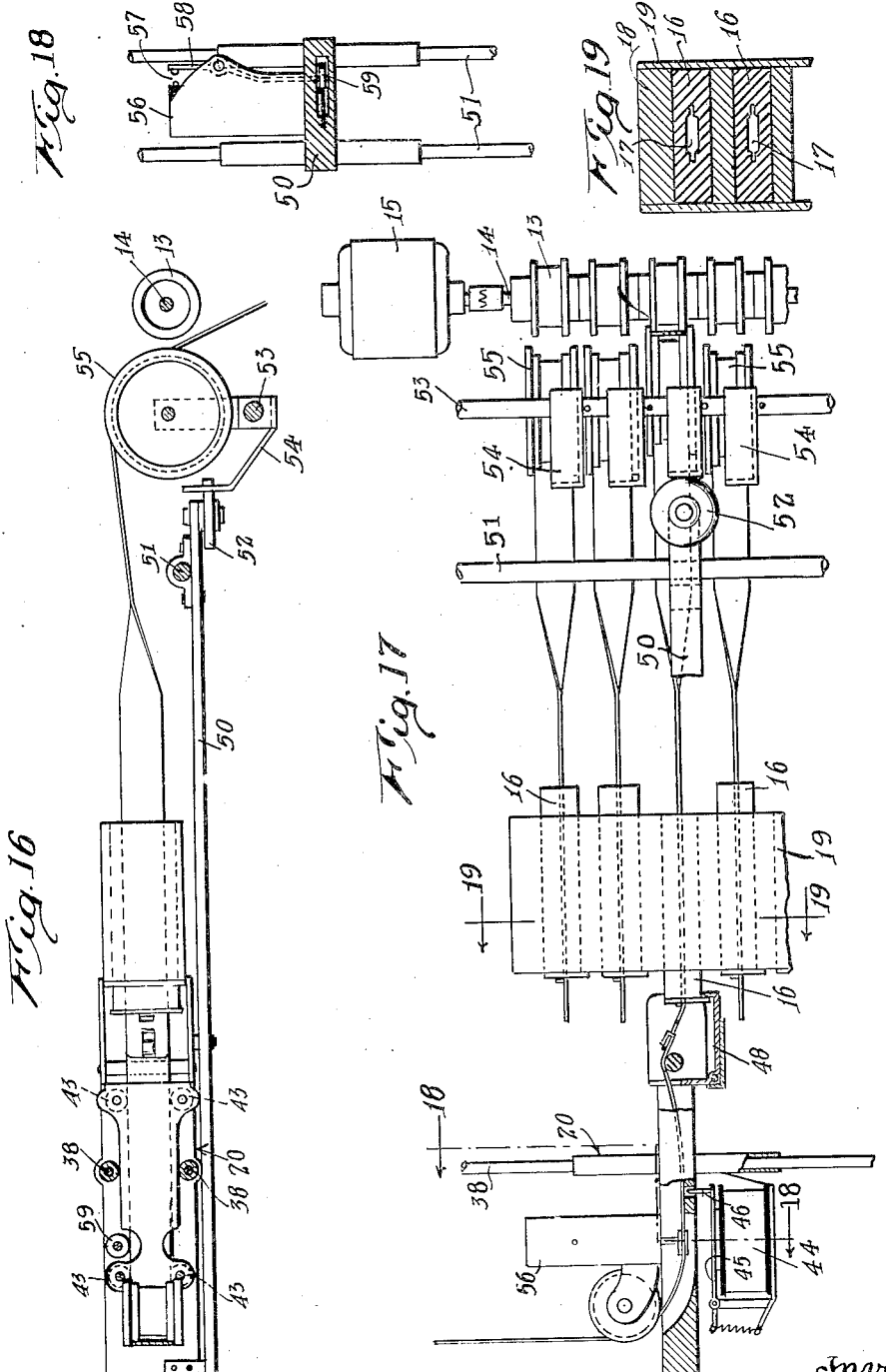

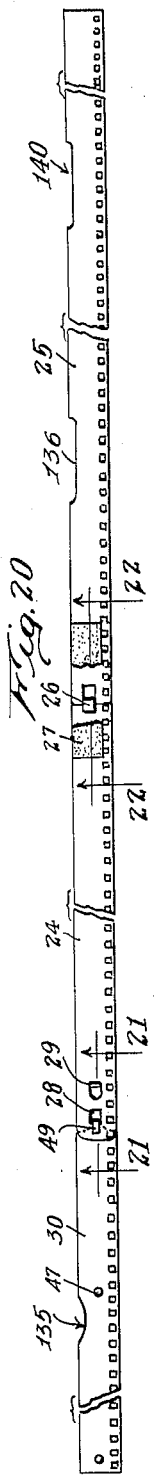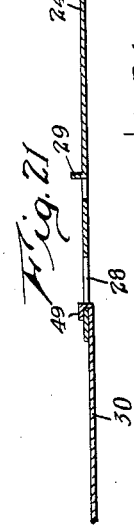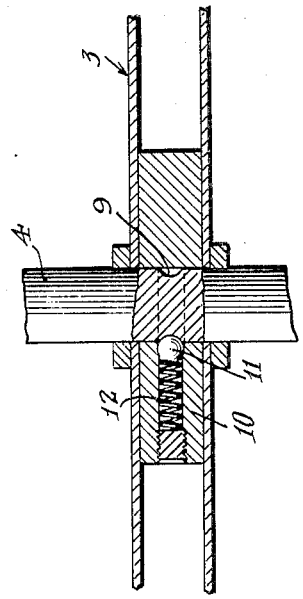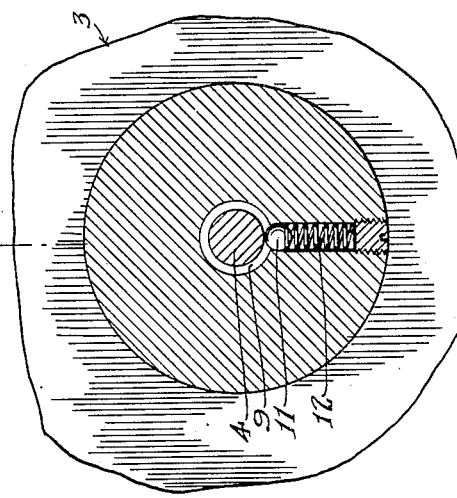

Patented Apr. 4, 1944

2,345,869

UNITED STATES PATENT OFFICE 2,345,869

APPARATUS FOR EXHIBITING MOTION PICTURE FILM

William C. Edwards, Los Angeles, Calif., assignor to Albert L. Rockett, Los Angeles, Calif.

Application June 18, 1941, Serial No. 398,588

15 Claims. (Cl. 88—17)

This invention relates to an apparatus for exhibiting motion picture film, and, while not necessarily confined thereto, is directed particularly to an apparatus by means of which a selected film may be automatically withdrawn from the supply of films, passed through a film projecting apparatus, and returned to the supply. The invention is of particular value for use as a coin-actuated motion picture machine.

Heretofore, the art has experienced great difficulty in constructing a mechanism for the satisfactory handling of motion picture films in response to the action of a coin-actuated mechanism. For practical operation, a coin-actuated motion picture projecting machine should be capable of selective action—that is to say, the operator of the machine should be able to select a particular film from a plurality of film supplied in the machine in response to the deposit in the machine of a coin. Because of the delicate nature of motion picture film, the art has heretofore had great difficulty in providing a mechanism, by means of which motion picture film can be automatically threaded into a projector machine exhibited and returned to its original position without damage or undue wear to the film.

It is a general object of the present invention to provide an apparatus for projecting film, by means of which any desired selected film may be withdrawn from a source of supply of films threaded and passed automatically through a projector and returned to the source of supply of films without damage or undue wear upon the film.

It is a further object of the present invention to provide an apparatus for projecting film, by means of which the several different films to be exhibited are at all times maintained essentially separate and independent of the other in the machine, so that they may be individually replaced from time to time and so that damage or wear of an individual film will in no manner interfere with the operations on the remaining film.

The apparatus for exhibiting motion picture film of the present invention, together with various additional advantages thereof, will best be understood from a description of a preferred form or example of an apparatus for exhibiting film embodying the present invention. For that purpose, I have hereinafter described such a preferred example of the invention in connection with the accompanying drawings.

In the drawings:

Figure 3 is an enlarged elevation of the projector and certain associated film-handling mechanism showing the position of the projector with the projector gate closed.

Figure 4 is a similar fragmentary view indicating the position of the mechanism to the gate opened.

Figure 5 is a fragmentary view of the slide for the gate.

Figure 6 is a section on the line 6—6 of Figure 3.

Figure 7 is a fragmentary section on the line 7—7 of Figure 3.

Figure 8 is a fragmentary plan view of the clutch means employed in the projector.

Figure 9 is a section on the line 9—9 of Figure 3.

Figure 10 is an elevation partially in section of the programming switch.

Figure 11 is an elevation at right angles to Figure 10.

Figure 12 is a section on the line 12—12 of Figure 10.

Figure 13 is a plan view of a rotary switch employed in the electrical control circuits.

Figure 14 is a section on the line 14—14 of Figure 13.

Figure 15 is a section on the line 15—15 of Figure 13.

Figure 16 is a plan view of certain mechanism used in making selective connection between the feeding mechanism of the apparatus and the film to be exhibited.

Figure 17 is an elevation of such of the mechanism shown in Figure 16.

Figure 18 is a fragmentary section on the line 18—18 of Figure 17.

Figure 19 is a fragmentary section on the line 19—19 of Figure 17.

Figure 20 is a plan view of the tape and film employed.

Figure 21 is a fragmentary section on the line 21—21 of Figure 20.

Figure 22 is a fragmentary section on the line 22—22 of Figure 20.

Figure 23 is a fragmentary section of certain friction drive means employed for driving film.

Figure 24 is a fragmentary section on the line 24—24 of Figure 23.

Figure 1:
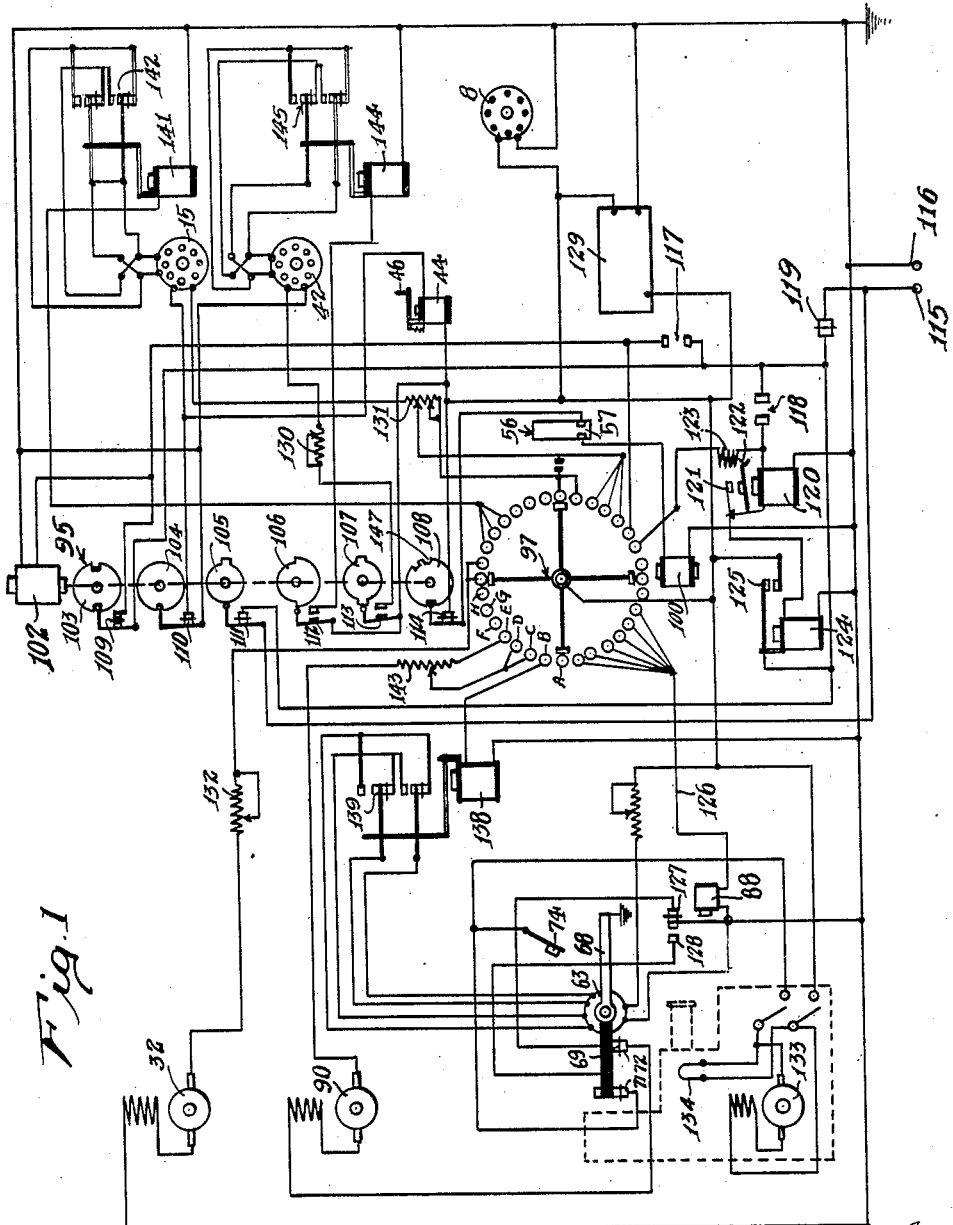
Figure 1 is an electrical diagram of electrical control circuits employed in the apparatus of the present invention.

Referring to the drawings, the apparatus includes a film projector 2, which may be of any usual or preferred type, except that certain modifications hereinafter described are made in the manner of operating a gate which holds the film in the position to be projected, and certain additions are made for the purpose of retracting film from the claws of the film-advancing mechanism of the projector for declutching said mechanism and providing substitute drives for the film during rewinding operations. It will be understood that the film projector may include any usual means for not only visually displaying the film but also for reproducing sound in case the film exhibited contains a sound track thereon.

The apparatus also includes a plurality of reels 3 for separately and independently holding the different film to be exhibited by the apparatus. The particular machine shown is indicated as provided with twelve different films to be exhibited, although obviously any larger or smaller number of reels may be provided, if desired. The reels are indicated as mounted upon a shaft 4, the lower end of which shaft is supported by a bearing 5, which may be of the multi-jaw type, or other type, permitting a slight pivoting action for releasing the shaft 4. The shaft 4 at its upper end is provided with a bearing 6 having a latch 7, by means of which the upper end of the shaft may be released for withdrawal of the shaft and reels 3 from the mechanism for replacing any one or all of the film thereon. At its upper end, the shaft 4 is connected to an electric motor 8, by means of which the shaft 4 may be continuously driven, as hereinafter described, in a direction tending to wind up the film on the reels 3. At all times in the operation of the machine, including that period where the film is being withdrawn from the reels 3, the shaft 4 is driven by the motor 8 in a direction tending to wind up the film on the reels 3. The reels 3, as indicated in Figures 23 and 24, have a friction drive connection with the shaft 4 so that such reels may be rotated when desired in a reverse direction to the rotation of the shaft 4, or may be rotated by said shaft 4. As indicated in Figures 23 and 24, there is provided a concave annular recess 9 on the shaft 4 for each of the reels 3 to be mounted thereon. Each reel 3 is provided with a hub 10 having a bore mounting a ball 11 engaging such recess 9 under the influence of a spring 12.

From each reel the film to be exhibited passes over drive pulleys 13, mounted on a shaft 14, which shaft is intended to be driven by a motor 15. The motor 15 is intended during the act of withdrawal of a film from one of the reels 3 to provide a sufficient driving force for the retraction of the film from the reel 3 to overcome the force provided by the motor 8, tending to rewind such film on the reel. It is a valuable feature of the method and apparatus of the present invention that the same is so designed as to be capable of very carefully controlling and regulating the forces imposed upon the film during all of the operations of handling such film. The actual movement of the film through the gate of the projector 2 during projecting operations is under control solely of the usual film-driving mechanism of the projector 2, but additional film-driving means are provided for assisting the movement of the film to the projector and for properly carrying the film away from the projector. If, during the operations of the machine, the mechanism is permitted at any time to exert an excessive pull or tension upon the film, the film may be rapidly worn. The apparatus of the present invention is so arranged that throughout the operations of either feeding the film to the projector or retracting the film therefrom the maximum tension imposed upon the film is in the nature of 2 to 8 ounces, and preferably around 3 to 4 ounces. The motor 15 is intended to impose upon the film being retracted from the reel 3 a sufficient driving force to almost drive the film towards the projector, but in the absence of the action of the projector it is preferable that the film remain stationary despite the driving force of the motor 15. In one form of mechanism that I have employed, each of the pulleys 13 is provided with a friction drive connection with the shaft 14 of the identical type shown in Figures 23 and 24 and used in connection with the drive of the reels 3 from the shaft 4. When such friction drive of the type shown in Figures 23 and 24 is provided for the pulleys 13, a driving force is imposed, tending to advance each of the films from the reels 3. Such force, however, is insufficient to actually advance the film through the guides of the mechanism leading to the projector in the absence of the assistance of the action of the film-driving mechanism of the projector 2.

However, in the preferred form of mechanism, I prefer to provide the pulleys 13 with a form of drive connection with the motor 15 of the type shown in Figuures 16 and 17, hereinafter described.

Figure 2:
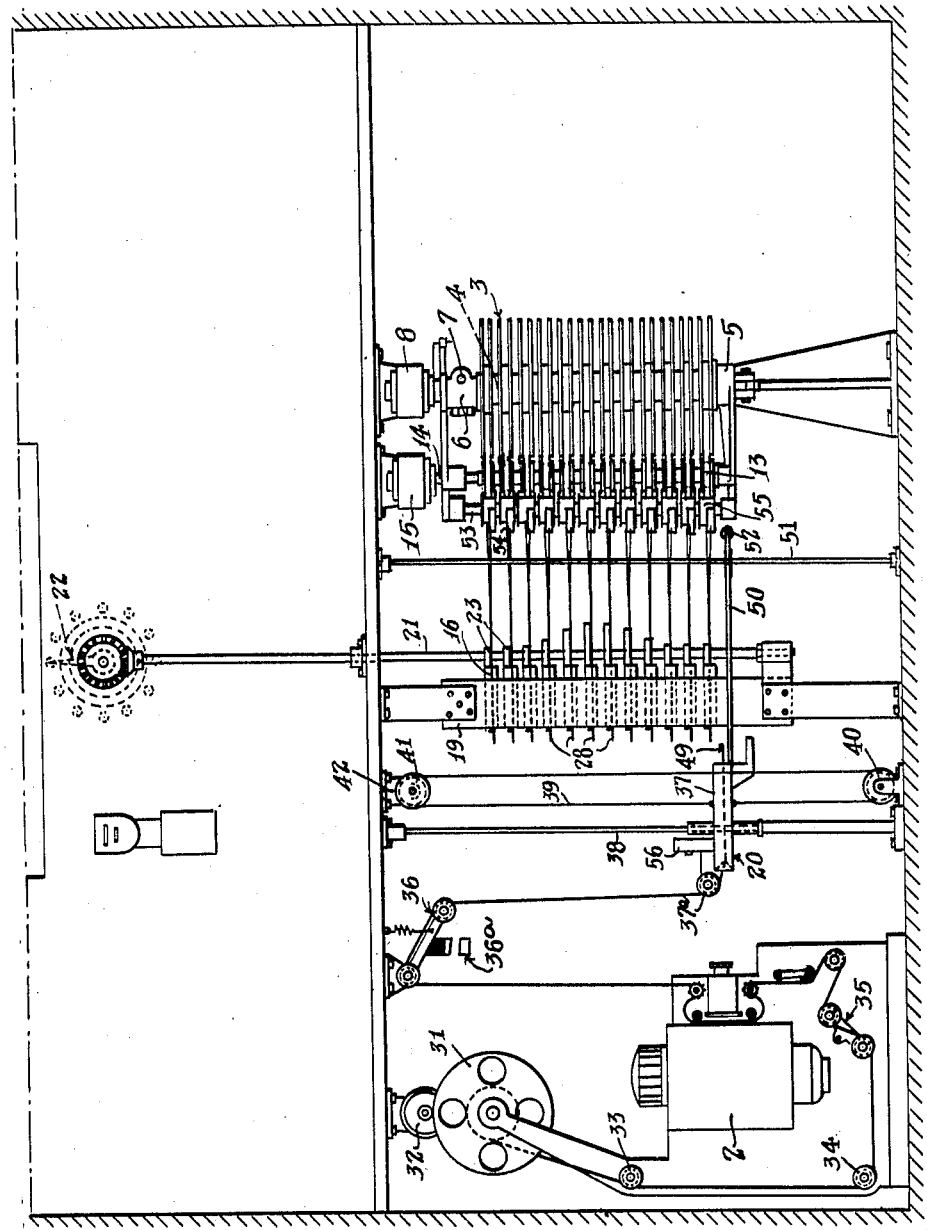
Figure 2 is an elevation of the means for selectively feeding the film to the projecting apparatus.

From the pulleys 13 the film passes to certain film selection mechanism. The film selection mechanism includes a plurality of guides 16 (Figures 2 and 19), which guides have openings 17 therein through which the film may be passed, and which openings are preferably designed so as to bear against the edges only of the film so as to avoid contacting the program portion of the film. The guides 16 are individually horizontally slidable between spacers 18 supported by standards 19. The act of selecting the particular film to be exhibited is performed by the movement of a particularly selected guide 16 outward a distance from the standard 19 in position, so that the film held by such guide may be brought into position for engagement with the feeding mechanism carried by an elevator 20. For selectively moving the guides 16 outward, I provide a shaft 21 leading to a selection-indicating means 22. The shaft 21 is provided with cams 23, so designed that during a single rotation of the shaft 21 each of the individual guides will be successively advanced from the standard 19 in position for making engagement with the feeding mechanism.

As is shown in Figures 20 and 21, each individual film carried by one of the reels 3 is provided with a leader portion 24. I prefer to form such leader portions of the film out of steel tape or other material stronger and more durable than the composition of regular motion picture film, and such leader may be attached to the regular motion picture film 25 in the manner indicated in Figure 22. The steel leader 24 is provided with a hook-shaped end 26. The regular film 25 has an aperture at its end to be engaged by said hook, and, for holding the leader and film together, adhesive tape, as indicated at 27, may be attached above and below the hook. The opposite end of the leader 24 is provided with an aperture 28, which is for the purpose of permitting connection to be made with the feeding means of the apparatus hereinafter described.

Near the aperture 28 the leader is provided with a stop member 29, which is intended to strike against the face of the guide 17 to limit the movement of the leader through the guide and in order to permit such guide to pull the film out into position where it may be engaged by the feeding means.

For the purpose of feeding the selected film through the projector, I provide a threading mechanism which includes a feeding tape 30, one end of which tape is permanently attached to a take-up reel 31 driven by an electric motor 32. The feeding tape 30 is likewise preferably formed of steel or other relatively durable material. From the take-up reel 31 the feeding tape passes over pulleys 33 and 34, over tensioning device 35, through the projector to a second tensioning device 36 and to the elevator 20. The elevator 20 consists of a body member 37, which is mounted for vertical sliding movement on rods 38. A cable 39 is attached to the elevator body 37 and is trained over pulleys 40 and 41, the pulley 41 being adapted to be driven by an elevator motor 42. The body 37 mounts a pulley 37a for the film or tape entering the elevator, and there is an opening through the body for the passage of either the film or tape. Two pairs of rollers 43 are provided for engagement with the edges of the film as the film or tape passes through the elevator body. The elevator also mounts a magnet 44 for actuating a pawl 45, provided with a pin 46, which pin 46 is intended to pass through an aperture 47 in the feeding tape 30, so that when the pin is engaged in such aperture the elevator 20 may be raised and lowered, without altering the position of the feeder tape 30 relative to the elevator. The elevator is also provided with a hinged stop member 48. The elevator 20 is mounted in the apparatus with reference to the standards holding the guides 16, so that as such elevator is moved upwardly the stop 48 will strike against any guide 16 which is projected from the standard 19 and thereby limit the upward movement of the elevator. The stop 48 is hinged so that the elevator may pass downwardly past any projecting guide. The feeder tape 30 is provided on its end with a hook 49, which is adapted to pass into the opening 28 on the leader tape. The operation, therefore, of the mechanism in selecting a particular film to be displayed is as follows:

The shaft 24 is rotated to a suitable position, as indicated by the indicator 22, to advance the guide 16 associated with the particular film to be displayed. When so advanced, the aperture 28 of the leader 24 is in position to make engagement with the hook 49 of the feeder tape 30. The elevator (which initially is in a position below the guides 16) is driven upward until the hook of the feeder tape passes through the aperture of the leader 24. The movement of the elevator is continued upwardly a sufficient distance to cause an engagement of the feeder tape with the leader, at which point the stop 48 strikes the bottom of the guide 16, limiting further movement of the elevator.

In the preferred form of apparatus, there is also supported by the elevator 20 an arm 50, one end of which is provided with a guide sliding on a rod 51. The arm 50 carries a roller 52. The roller 52 is for the purpose of establishing a drive connection between the motor 15 and the pulley 13 of the particular film to be displayed by the mechanism. In the preferred form of apparatus, the pulleys 13 are mounted on a rod 53 by brackets 54. The motor 15 drives spools 55. The roller 52 is adapted to contact the bracket 54 associated with the particular film to be displayed and pivot that bracket to bring its pulley into driving contact with one of the spools driven by the motor 15. Thus, in the preferred form of the invention, a driving force is imparted by the motor 15 only to the particular film to be projected. To further control the tension on the film, I provide electric contacts 36a normally open, but designed to be closed by tension device 36 when the tension imposed on the film rises above a predetermined value. The contacts 36a then short resistance in the circuit of motor 15 and speed up motor 15, and reduce the tension on the film.

There is also mounted upon the elevator body 20 a micro-control switch 56, which includes a contact 57 adapted to be made by a pivoted arm 58, which carries a roller 59 adapted normally to roll on the edge of either the feeding tape 30, the leader tape 24, or the film. Certain notches hereinafter described in connection with the electrical diagram are provided on the feeder tape 30 and on the film 25 to be projected, which will permit the roller to close the contact 57 of the micro-switch to effect certain control operations.

Now, referring more particularly to Figures 3 to 9, inclusive, certain additions are made to the mechanism of the projector 2 for the purpose of controlling the movement of the film through the projector to reduce the wear on the film. When the film is being displayed by being passed through the projector, it is driven through the projector by the usual drive means of the projector, but in many of the operations of the apparatus it is desirable to release the film from the claw-driving mechanism of the projector to permit the film or the tapes associated with the film to be passed through the projector at different speeds and under conditions to reduce wear. Particularly during the act of threading the projector with the film to be displayed is it necessary to open the gate of the film to allow the various projections, hooks, etc., on the threading tape and leader of the film to pass through the projector. Special means are provided in accordance with the present invention to automatically actuate the gate of the projector. Special means are provided for disconnecting the sprockets of the projector from the usual drive means of the projector and substituting therefor other drives operated at different speeds, and means are provided for maintaining the portion of the film passing in front of the aperture in correct position and with the correct adjacent loops for permitting film to be correctly engaged upon closing the gate and allowing for immediate commencement of the usual driving operations of the projector.

As illustrated in Figures 3 to 9, inclusive, the gate 60 of the projector which holds the film in projecting operations against the aperture of the projector is mounted on a plate 61, which is slidably supported by the projector. The plate 61 also supports the lens 62 of the projector. For automatic opening and closing of the gate, I provide a gate motor 63 which may have a friction drive 64 with a linkage 65, one end of which is attached to the gate slide 61, as indicated at 66. By energizing the motor 63, the motor is capable of operating the linkage from the position shown in Figure 3, where the gate is closed to an expanded position indicated in Figure 4, where the gate is opened and the film passing the aperture of the gate is released from the usual drive claws 67 of the projector drive mechanism. Associated with the gate opening mechanism are certain contact devices, including an arm 68 actuated on movement of the gate motor. The arm 68 is indicated as having two front contacts 69 and 70 adapted in the closed position to make contact with contacts 71 and 72, respectively, and with the back contact 73 adapted in the closed position to make contact with the contact 74, supported by a spring-pressed arm 75. The purpose of such contacts is hereinafter more particularly described in connection with the description of the electrical diagram of the apparatus.

In passing a motion picture film by the aperture of the projector 2, it is, of course, driven in the usual manner by the claws 67 in a step-by-step manner, and in order that such driving action will not impose a tension upon the film it is necessary to maintain a loop of film both above and below the aperture. Mechanism is provided for maintaining the correct size of such loops during the operation of opening and closing the gate. For this purpose, I provide two pivoted arms 76 and 77, carrying at their ends rollers 78 and 79 for engagement with the film adjacent the usual drive sprockets 80 of the projector and holding a loop of film during the act of opening the gate. For actuating the arms, I provide links 81 and 82 attached at one end to the arms, as indicated, and at the other end to the gate 60.

For the purpose of disconnecting the drive sprockets 80 of the projector from the usual drive mechanism, I provide the mechanism hereinafter described. The drive sprockets 80 are indicated as geared to an idler 84, and one of the sprockets is indicated driven from gearing 85 through a shaft 86. The gearing 85 may lead to the usual drive motor of the projector. As ordinarily constructed, the shaft 86 is solidly connected with the gearing 85, but, in order to provide the novel control of the present invention, I break such shaft and include therein a jaw clutch 87 adapted to be operated by a magnet 88. Connected to the sprockets 80, I provide an additional gear 89 adapted to be driven by a motor 90. I also preferably provide a gear 91 meshing with the sprocket gearing for the purpose of driving a pulley 92, which is for the purpose of providing a smooth movement of the film from the projector by the second reproducing apparatus 93.

Now, referring more particularly to Figures 10 to 15 of the drawings, the electrical control mechanism of the apparatus includes in addition to the elements herein described a programming switch 94, illustrated in Figures 10 to 12, inclusive, and a motor-driven control switch 95, illustrated in Figures 13 to 15, inclusive. The programming switch 94 consists of a plurality of stationarily mounted contacts 96 arranged circumferentially and adapted to be successively engaged by contact points on a rotor 97, which has four arms supporting contact points at intervals of 90° apart. The rotor 97 of the programming switch is intended to be rotated by a ratchet wheel 98, actuated by a pawl 99 of the magnet 100. The motor-actuated control switch 95 consists of a shaft 101 driven by a motor 102, which shaft carries a plurality of cams 103 to 108, inclusive, the particular shape of which cams is indicated on the electrical diagram in Figure 1. Such cams engage rollers for actuating switches 109 to 114, respectively.

The method of handling film in the operation of the apparatus of the present invention will be understood from a description of such operation in connection with the electrical diagram of Figure 1. In the electrical diagram, a pair of power mains 115 and 116 is indicated, which may be of the A. C. type.

The operation of the apparatus of the present invention is preferably commenced by the insertion of a coin in a coin chute of the apparatus, and said coin operates to momentarily close the coin-actuated switches 117 and 118. The momentary closing of the switch 117 establishes a circuit from the main 115, through the manually operated switch 119 (which is the "on" and "off" switch for the apparatus) to the switch 117, through the motor 102 of the motor-driven switch 95 to the main 116. Accordingly, the motor 102 starts rotating the series of cams 103 to 108, inclusive, in a counter-clockwise direction, as viewed in Figure 1. The cam 103 is provided with two notches 180° apart, and the switch 109 associated with the cam 103 is adapted to be closed whenever the roller associated with that switch is moved out of one of the notches. As soon as the motor 102 is energized, therefore, switch 109 is closed and a circuit is established for maintaining the motor 102 energized until the motor has driven the switch through an arc of 180°, whereupon the switch 109 will be opened by its roller dropping in the opposite notch of the cam 103. Accordingly, the deposit of a coin in the machine causes the motor-actuated switch 95 to be rotated through an arc of 180°, whereupon the switch stops. The gearing of such switch is preferably designed so that a short interval of time, such for example as 8 seconds, is consumed by the switch in making this rotation in order to allow a period of time for the performance of certain operations by the apparatus during this action. The cams 103 to 108, inclusive, are shown in the position they occupy after the motor 102 has rotated the switch 180° from its initial position.

The closing of the coin-actuated switch 118 energizes a relay 120, which closes its contacts 121, which contacts are provided with a latch 122 for holding the same closed until released by the energization of a releasing magnet 123. The closing of contacts 121 in turn establishes a circuit for energizing a relay 124 to close its contacts 125. The closing of the contacts 125 of relay 124 connect the rotor 97 of the programming switch to the main 115 (through "on" and "off" switch 119). The programming switch has four sets of contacts for cooperating with the four arms of the rotor 97, and the corresponding contacts of such switch which make corresponding connections with the arms of the rotor 95 are marked A to H, inclusive. At the commencement of the operation of the machine, the rotor 97 is in position to engage the H contacts. When the rotor 97 is connected to the main, as described, a circuit is established through the rotor to one of the H contacts, through line 126, to the magnet 88, which releases the clutch 87 to disconnect the sprockets of the projector machine from the normal driving mechanism of the projecting machine. Simultaneously, the magnet 88 closes contact 127 and opens contact 128. The opening of contact 128 prevents temporarily the supply of current to the projector.

The energizing of relay 124 has the further effect of establishing a circuit from the main 115 through contacts 125 of relay 124, through the motor 8, which frictionally drives reels 3, so that throughout the operation of the machine the film on the reels 3 is under tension, tending to maintain the same on the reels. An audio amplifier 129, indicated as paralleling the motor 8, is simultaneously energized, said audio amplifier serving to energize the sound system of the apparatus.

During the interval of time that the motor switch is rotating 180°, cam 106 allows its contact 112 to be closed. This establishes a circuit through a speed control resistor 130 to the elevator motor 42. The elevator motor is correspondingly energized and the elevator 20 is driven upward until connection is established in the manner previously described between the leader 24 of the selected film and the feeding tape 30 of the apparatus. The motor 42 is preferably selected to be of a type which will not be damaged by a short continuation of the supply of energy thereto after the elevator has been stalled.

Upon completion of the 180° rotation of the rotary switch 95, cam 108 allows the closing of its contact 114, establishing a circuit from the mains through the contact 57 of the film-actuated micro-switch 56 through the magnet 100, which operates the pawl of the ratchet wheel 98 of the program switch 94. As a result, the rotor 97 of the programming switch is rotated from the position where it is engaging the H contacts to the position in which it engages the A contacts.

Likewise, upon completion of said 180° movement of the rotary switch 95, cam 104 allows contacts 110 to be closed, which establishes a circuit from the mains through the magnet 44 (mounted upon the elevator 20 and holding the pin 46 into the opening 47 in the feeding tape). Accordingly, when magnet 44 is energized, the pin is retracted from the feeding tape, rendering it possible for the tape and film to be drawn through the projector.

Upon rotation of the programming switch 94 into position to make the A contacts, a circuit is established from one of the A contacts through a speed control resistor 131 to the drive motor 15, through the contact 110 controlled by cam 104 back to the main. The driving motor is accordingly energized to apply tension tending to counterbalance the reel motor 8 and drive the film towards the projector.

The movement of the programming switch 94 in position to make the A contacts further establishes a circuit from one of the A contacts through a speed control resistor 132 to the film take-up motor 32. The film take-up motor is accordingly energized for the purpose of winding the film passed from the projector upon the take-up reel.

Upon movement of the rotary switch off the H contacts, the magnet 88 is deenergized, connecting the clutch of the projector with the projector sprockets, and positioning the projector in position to drive the film or tape through the projector. Simultaneously, contacts 127 are broken and contacts 128 closed. The closing of contact 128 establishes a circuit through the arm 68 of the gate motor 63 through contact 71 closed by the arm of the gate motor to the motor 133 and lamp 134 of the projector. Accordingly, the film moving mechanism of the projector and the lamp of the projector are energized.

By the sequence of operations described, the various film-driving means of the apparatus—that is, the film take-up motor 32, the film drive motor 15, and the motor 133 of the projection machine—are energized and the movement of the film through the projector commences with the gate of the projector in the open position. As soon as the movement of the film starts, the switch 57 actuated by the film is opened. At the start of the operations, this switch is closed by the engagement of the roller 59 (Figures 17 and 18) with a notch 135 in the feeding tape 30. Immediately upon the start of the movement of the feeder tape and film through the projector, the roller moves out of this notch, opening the switch 57. This deenergizes the magnet 100, which operates the ratchet mechanism of the programming switch, and positions such mechanism in condition to allow for a subsequent movement of the programming switch upon a subsequent closing of the film-actuated switch 57.

When the tape and film have been moved sufficiently far to bring the notch 136 in the film 25 into contact with the roller of the switch 57, the magnet 100 of the programming switch is again energized and the programming switch moved from position where its rotor is engaging the A contacts to a position to engage the B contacts. The notch 136 is on the film 25 in front of the portions of the film having sound picture developments therein which are to be displayed by the projector.

Upon rotation of the programming switch to make the B contacts, a circuit is established from one of the B contacts to a reversing relay 138, which operates reversing contacts 139 for reversing the field of the projection gate motor 63. Accordingly, the gate motor operates to close the gate of the projector to bring the film into proper focus with the aperture. The motor 63 is preferably of the type which is capable of being left energized while held in a stopped position without damage so that it may drive the gate to the closed position and be retained energized throughout the operations of the apparatus.

During the movement of the gate from the opened to the closed position, the circuit to the projection motor 133 of the projection machine is opened by separation of contacts 71 from the moving arm 68 of the gate motor, so that during the operation of closing the gate there is no movement of the film or the tape through the projection machine. Upon arrival of the gate at the closed position, contact is made between the arm 68 and contact 74 for reestablishing a circuit to the projection motor 133 and lamp 134. The movement of the film through the apparatus starts again and continues until that portion of the film which carries the program of the film has passed through the projector.

On the film 25, following the portion of the film carrying the program, is provided a notch 140 which, by making contact with the roller of the film-actuated switch 57, effects a further energization of the magnet 100, which operates the ratchet mechanism of the programming switch 94 and accordingly advances the programming switch into position so that its rotor engages the C contacts.

When the programming switch makes the C contacts, a circuit is established through one of the C contacts to a reversing relay 141, which thereby operates its reversing contacts 142 for the purpose of reversing the field of the drive motor 15. Accordingly, the drive motor 15 will now be energized in the direction tending to cause the film to be rewound back upon the reels 3. Simultaneously, the original circuit energizing the drive motor through the speed control resistance 131 is broken and a new circuit established through one of the C contacts through the speed control resistor 131 in such a manner as to speed up the action of the drive motor 15 to provide for increased speed of movement of the film during rewinding operations.

Simultaneously, one of the C contacts reestablishes the circuit through line 126 to the magnet 88, which operates the clutch 87 between the drive motor 133 of the projector and the drive sprockets 80 of the projector to release the clutch and disconnect the sprocket 80 from the motor 133 of the projector. Simultaneously, contact 128 is broken and contact 127 made. The movement of the programming switch 94 off the B contacts has broken the circuit to the reversing relay 138 of the gate motor, so that the gate motor opens the gate of the projector previous to the rewinding operations. Upon closing of the contact 127, a circuit is established from one of the C contacts of the programming switch through the speed control resistor 143 to the rewind motor 90, which now drives the sprockets 80 of the projector. The circuit is completed through the contact 72, which makes contact with contact 69 of the arm 68 of the gate motor when the gate is in the open position, through the contact 127 closed by energizing the magnet 88 of the clutch mechanism. With the movement of the programming switch off the B contacts the circuit to the take-up motor 32 is broken.

By means thus described, the apparatus now commences to rewind the film upon the reel 3 at high speed. During the first portion of the rewind operation, the notch 140 on the film effects a further energization of the magnet 100 of the ratchet wheel of the programming switch 94 to move the programming switch over into position to make the D contacts. This operation of the programming switch, however, establishes no new circuit connections.

The operation of rewinding the film continues until the notch 136 on the film 25 engages the film-actuated switch 57, whereupon a further energization of the magnet 100 of the ratchet mechanism of the programming switch advances the programming switch to position to make the E contacts, at which position connections to the speed control resistor 143 of the projector rewind motor 90 are altered to decrease the speed of rewinding the film. The film continues to be rewound at a reduced speed until the notch 135 on the feeder tape 30 encounters the switch 57, whereupon a further energization of the magnet 100 of the ratchet mechanism of the programming switch 94 moves the programming switch into position to establish the F contacts.

Upon arrival of the programming switch in position to make the F contacts, the flow of current to the drive motor 15 is uninterrupted and the flow of current to the projection rewind motor 90 is interrupted. The movement of the film and tape through the machine is stopped by the contact of the stop 29 on the leader striking one of the guides 16 of the selective mechanism of the machine. This stops the movement of the film in position, so that the film-actuated switch will be held closed by the notch 135 and so that the aperture 47 of the feeder tape 30 is in position in order that it may be engaged by the pin 46 actuated by magnet 44. Simultaneously, a circuit is established from one of the F contacts to the motor 102 of the rotary switch 95 to again rotate such switch 180° in a counter-clockwise direction to return such rotary switch to its original position. At the commencement of the rotation of the rotary switch, contact 110 is opened by cam 104, deenergizing the magnet 44 and allowing the pin 46 to drop into the hole 47 in the steel feeder tape 30 of the film. Contact 112 controlled by cam 106 is allowed to close establishing a circuit to a reversing relay 144, which actuates reversing contacts 145 of the elevator motor 42, which reverses the direction of flow of current to the elevator motor, so that when the elevator motor is energized it will move downwardly to disconnect the feeder tape 30 from the leader 24 of the film. Contact 113 controlled by cam 107 is closed and energy is supplied to the elevator motor 42 downwardly. To disconnect the hook of the feeder tape 30 from the leader 24 of the film the elevator 20 continues to descend until it reaches its initial position. Contact 114 is opened on the initial movement of cam 108 and allows the magnet 100 of the ratchet mechanism of the programming switch 94 to be prepared for a subsequent operation.

The rotary switch 95 continues its rotation until notch 146 on cam 108 is brought into position to allow a further closing of contact 114, at which time the magnet 100 of the programming switch is again energized to move the programming switch into position to make the G contacts, at which time the releasing coil 123 of relay 120 is energized to open the contacts 21 so that relay 124 is deenergized and the supply of current to the programming switch interrupted. The coil 123 is preferably provided with a thermostat delay so that it will not release contacts 121 until the rotary switch has advanced sufficiently to have brought notch 147 of cam 108 in position to effect a further operation of the magnet and ratchet mechanism of the programming switch to advance the programming switch into position to make the H contacts. In the H position the return circuit to the releasing coil 123 of relay 120 is disconnected and the apparatus is again in position for a further operation on the deposit of additional coins.

I claim:

1. A motion picture projection apparatus, including a projector having a gate through which the film to be exhibited is to pass, means for automatically opening and closing said gate, a take-up means, a threading tape connected at one end of said take-up means and movable through said gate and provided at its other end with means for making detachable connection with the selected film to be exhibited, a plurality of separate film-holding members, means for selecting a film from said holding means to be connected to said threading member, means for automatically moving said threading member for establishing said connection, and means for subsequently moving the threading member film through said gate to effect exhibition of said film, said means including means for operating said automatic gate opening means for maintaining the gate of said projector in open position while said threading member passes therethrough and for subsequently closing said gate during passage of the film through said projector.

2. A motion picture projection apparatus, including a projector having a gate through which the film to be exhibited is to pass, means for automatically opening and closing said gate, a take-up means, a threading tape connected at one end of said take-up means and movable through said gate and provided at its other end with means for making detachable connection with the selected film to be exhibited, a plurality of separate film-holding members, means for selecting a film from said holding means to be connected to said threading member, means for automatically moving said threading member for establishing said connection, means for subsequently moving the threading member film through said gate to effect exhibition of said film, said means including means for operating said automatic gate opening means for maintaining the gate of said projector in open position while said threading member passes therethrough and for subsequently closing said gate during passage of the film through said projector, and means for automatically reversing the movement of the film and threading tape at the completion of the operation of exhibiting the film, said means including means for opening the gate of said projector.

3. A motion picture projection apparatus, including a projector having a gate through which the film to be exhibited is to pass, means for automatically opening and closing said gate, a take-up means, a threading tape connected at one end of said take-up means and movable through said gate and provided at its other end with means for making detachable connection with the selected film to be exhibited, a plurality of separate film-holding members, means for selecting a film from said holding means to be connected to said threading member, means for automatically moving said threading member for establishing said connection, means for subsequently moving the threading member film through said gate to effect exhibition of said film, said means including means for operating said automatic gate opening means for maintaining the gate of said projector in open position while said threading member passes therethrough and for subsequently closing said gate during passage of the film through said projector, and means for automatically reversing the movement of the film and threading tape at the completion of the operation of exhibiting the film, said means including means for opening the gate of said projector, said means for reversing the movement for rewinding the film including means for effecting such reverse movement at an increased speed.

4. A selective motion picture apparatus, including a film projector having a gate, a threading tape passing through said gate, a plurality of separate film-holding members, films carried by said holding members and provided with leaders, said threading tape and said leaders being adapted to be detachably connected, automatic means for bodily moving the end of said threading tape relative to said leaders to establish such detachable connection between said threading tape and one of said leaders, means for selecting a particular leader to be so detachably connected with said threading tape by said relative movement, and automatic means for passing said detachably connected threading tape and leader through said projector gate.

5. A selective motion picture apparatus, including a film projector having a gate, a threading tape passing through said gate, a plurality of separate film-holding members, films carried by said holding members and provided with leader sections, said threading tape and said leaders being adapted to be detachably connected, means for selectively advancing a particular leader, automatic means for bodily moving the end of said threading tape relative to said leaders to establish such detachable connection between the threading tape and the advanced leader, and automatic means for subsequently passing the detachably connected threading tape and leader through said projector gate.

6. A selective motion picture apparatus, including a film projector having a gate, a threading tape passing through said gate, a plurality of separate film-holding members, films carried by said holding members and provided with leaders, said threading tape and said leaders being adapted to be detachably connected, automatic means for bodily moving the end of said threading tape relative to said leaders to establish such detachable connection between said threading tape and one of said leaders, said automatic means including a member adapted to be automatically detachably connected to said threading tape during said bodily movement and to be disconnected therefrom after establishment of the connection between the threading tape and leader, means for selecting a particular leader to be so detachably connected to said threading tape by said relative movement, and automatic means for passing the detachably connected threading tape and leader through said projector gate.

7. A selective motion picture apparatus, including a film projector having a gate, a threading tape passing through said gate, a plurality of separate film-holding members, films carried by said holding members and provided with leaders, said threading tape and said leaders being adapted to be detachably connected, means for selectively advancing said leaders, automatic means for bodily moving the end of said threading tape relative to said leaders to establish such detachable connection between said threading tape and the advanced leader, said automatic means including a member adapted to be automatically detachably connected to said threading tape during said relative movement and to be automatically disconnected therefrom at the completion of said movement, and automatic means passing said detachably connected threading tape and leader through said projector gate.

8. A selective motion picture apparatus, including a film projector having a gate, a take-up means, a threading tape attached at one end to said take-up means and threaded through said gate, a plurality of separate film-holding members, films carried by said holding members and provided with leaders, said threading tape and said leaders being adapted to be detachably connected, means for selecting the particular leader to be so detachably connected, an automatic means for holding the end of said threading tape and bodily moving the same relative to said leaders to establish such detachable connection between said threading tape and the selected leader, and automatic means for subsequently passing the threading tape and film detachably connected therewith through said projector gate to said take-up means, and thereafter returning said film to said holding member.

9. A motion picture projection apparatus, including a plurality of reels, a movable guide member for the film on each reel, the film on each reel being provided with a leader having a stop bearing against its guide, means for selectively moving said guides for advancing a leader, a threading tape adapted to be detachably connected with any one of said leaders, mechanism including an elevator movable to make connection between said threaded tape and the advanced leader.

10. A motion picture projection apparatus, including a plurality of reels, a movable guide member with a film on each reel, the film on each reel being provided with a leader having a stop bearing against its guide, means for selectively moving said guides for advancing a leader, a threading tape adapted to be detachably connected to any one of said leaders, and mechanism including an elevator movable to make connection between said threading tape and said advanced leader, said mechanism including means for holding said tape during connecting operations and for releasing said tape at the conclusion thereof.

11. A motion picture apparatus, including a plurality of reels, a movable guide member for the film on each reel, the film on each reel being provided with a leader having a stop bearing against its guide, a threading tape adapted to be detachably connected with any one of said leaders, an elevator provided with means for holding the end of said threaded tape, said means including an electro-magnet for the release of said tape, said elevator being movable relative to said guide members for establishing such detachable connection between the threading tape and the advanced leader, the elevator having means for engaging the advanced guide to stop the movement of said elevator in the position where said connection is established.

12. A motion picture apparatus, including a plurality of reels, a movable guide member for the film on each reel, the film on each reel being provided with a leader having a stop bearing against its guide, a threading tape adapted to be detachably connected with any one of said leaders, an elevator provided with means for holding the end of said threaded tape, said means including an electro-magnet for the release of said tape, said elevator being movable relative to said guide members for establishing such detachable connection between the threading tape and the advanced leader, the elevator having means for engaging the advanced guide to stop the movement of said elevator in the position where said connection is established, film driving means including selectively operable clutches, and means operated by said elevator for selecting the clutch to be driven.

13. A motion picture projection apparatus, including a plurality of separate film-holding reels, a threading tape adapted to be detachably connected with the leaders of any one of said films, a projector having means for driving the threading tape and film attached thereto by the aperture of said projector in exhibiting operations, a yielding drive means for said film-holding reels normally tending to wind the film on said reels, a supplemental film-driving means for withdrawing film from said reels substantially counterbalanced by said yielding reel driving means so as to be normally ineffective for movement of the film in the absence of the assistance of the drive means of said projector, and means for effecting a selective connection between said threading tape and the leaders of said film to permit the drive means of said projector to pass said threading tape and thereafter said film by the aperture of said projector in exhibiting operations.

14. A film projection apparatus, including a plurality of film-holding reels, means for yieldingly driving the reels in position to wind the film on said reels, a film-driving means for engaging the leaders of said films tending to withdraw the film from said reels and normally counterbalanced by said first driving means, a projector having means for driving a threading tape and film by the aperture of said projector in exhibiting operations, a threading tape normally threaded to said projector, and means for selectively establishing a connection between said threading tape and the film on any one of said reels.

15. A film projection apparatus, including a projector having a film-driving means, a plurality of separate film-holding members, means for yieldingly driving said film-holding members in a direction to retain the film thereon, means for yieldingly urging film on said members towards the projection machine, said means being normally ineffective for movement of the film in the absence of cooperation of the driving means of said projector, and means for selectively connecting one of the films of said holding means with said projector driving means.

WILLIAM C. EDWARDS.